(12) United States Patent
Anderson et al.

(10) Patent No.: US 9,313,311 B2
(45) Date of Patent: Apr. 12, 2016

(54) METHOD FOR USING A COMMUNICATION SYSTEM CONNECTED TO A PLURALITY OF MOBILE DEVICES AND PRIORITIZING THE MOBILE DEVICES, COMMUNICATION SYSTEM, AND USE THEREOF

(75) Inventors: Elisabet A. Anderson, Holland, MI (US); Mark Zeinstra, Holland, MI (US); Michael J. Sims, Zeeland, MI (US)

(73) Assignee: JOHNSON CONTROLS TECHNOLOGY COMPANY, Holland, MI (US)

( * ) Notice: Subject to any disclaimer, the term of this patent is extended or adjusted under 35 U.S.C. 154(b) by 477 days.

(21) Appl. No.: 12/718,064

(22) Filed: Mar. 5, 2010

(65) Prior Publication Data

US 2011/0217929 A1     Sep. 8, 2011

(51) Int. Cl.
*H04B 7/00* (2006.01)
*H04M 1/60* (2006.01)

(52) U.S. Cl.
CPC ........ *H04M 1/6091* (2013.01); *H04M 2250/02* (2013.01)

(58) Field of Classification Search
CPC .................................................. H04M 1/6091
USPC ............... 455/41, 41.2, 518, 569, 422.1, 500; 370/37
See application file for complete search history.

(56) References Cited

U.S. PATENT DOCUMENTS

| | | | |
|---|---|---|---|
| 7,031,659 B2 | 4/2006 | Tomoda et al. | |
| 2002/0107041 A1 | 8/2002 | Mori | |
| 2002/0177472 A1 | 11/2002 | Tomoda | |
| 2003/0032460 A1* | 2/2003 | Cannon et al. | ................. 455/569 |
| 2004/0151285 A1 | 8/2004 | Sychta | |

OTHER PUBLICATIONS

U.S. Appl. No. 61/162,976, filed Mar. 2009, Brewer et al.*
International Search Report dated Jun. 30, 2011, PCT/US2011/026609.

* cited by examiner

*Primary Examiner* — Hsin-Chun Liao
(74) *Attorney, Agent, or Firm* — The Dobrusin Law Firm, P.C.

(57) ABSTRACT

A method and a communication system is disclosed for using a communication system connected to at least a first mobile device and a second mobile device, wherein the communication system is operable in at least a first operating state and a second operating state, wherein the connection of the communication system to the first mobile device is prioritized in the first operating state and wherein the connection of the communication system to the second mobile device is prioritized in the second operating state.

7 Claims, 3 Drawing Sheets

| A | | B | | C |
|---|---|---|---|---|
| 122 | | 124 | | 124 |
| 121 | | 121 | | 122 |
| 123 | | 123 | | 123 |
| 124 | | 122 | | 121 |

Fig. 3

METHOD FOR USING A COMMUNICATION SYSTEM CONNECTED TO A PLURALITY OF MOBILE DEVICES AND PRIORITIZING THE MOBILE DEVICES, COMMUNICATION SYSTEM, AND USE THEREOF

BACKGROUND

The present application relates to a method for using a communication system connected to a plurality of mobile devices and especially to a method for using the communication system in a motor vehicle (in-vehicle communication system). The present invention also relates to a communication system, especially an in-vehicle communication system, and to the use of such a communication system, especially inside a vehicle.

Vehicles include a number of subsystems that may be controlled by a user interface, such as an in-vehicle control system. Such in-vehicle control systems comprise more and more communication interfaces or communication modules such that mobile devices can be connected to the vehicle system. Examples of such mobile devices include media players, mobile phones, portable of handheld computers, personal digital assistants, smart phones, navigational devices off-board data storage devices or other handheld/mobile devices.

With an increased number of mobile devices connectable to the in-vehicle systems, especially the in-vehicle communication systems, it is more and more difficult to correctly control the use of such mobile devices and their connections to the in-vehicle communication system. One approach of selecting one mobile phone out of a plurality of devices is described in U.S. Pat. No. 7,031,659.

The problem is that more and more the driver of the vehicle, i.e. the user of the mobile devices and of the off-board contents, is either not able or not allowed by law to control functions and/or applications used in the mobile devices and to use the off-board contents as this could lead to a reduced attentiveness of the user/driver to traffic conditions which is not desirable.

Therefore, the need exists of providing solutions allowing for a possibility to control and use the mobile devices connected to the in-vehicle communications system such that the safety level or the level of attentiveness of the driver is not excessively reduced while driving.

SUMMARY

This problem is solved by the present invention. This invention provides a method for using a communication system connected to at least a first mobile device and a second mobile device, wherein the communication system is operable in at least a first operating state and a second operating state, wherein the connection of the communication system to the first mobile device is prioritized in the first operating state and wherein the connection of the communication system to the second mobile device is prioritized in the second operating state.

According to the present invention it is advantageously possible to use the mobile devices connected to the communication system in a more simple form as the mobile devices are already prioritized. In the context of the present invention, prioritization means to choose a one of a plurality of mobile devices connected to the communication system when using the communication system in a specific way or in a specific operating state. Such operating states include but are not limited to, e.g., the use of the communication system and/or the mobile device for placing a telephone call, the use of the communication system and/or the mobile device for receiving a telephone call, the use of the communication system and/or the mobile device for sending or writing a message such as an e-mail, an SMS (Short Message System) or an MMS (Multimedia Message System) according to a standard for mobile communication, the use of the communication system and/or the mobile device for conducting a navigational task, the use of the communication system and/or the mobile device for listening to music or another audio and/or video and/or multimedia content, the use of the communication system and/or the mobile device for conducting a financial transaction.

The communication between the communication system and the mobile devices is possible using either wired or wireless communication means. According to the present invention, wireless communication means are preferred, such as a Bluetooth communications protocol, an IEEE 802.1 1x communications protocol, an IEEE 802.16 communications protocol, or other wireless communication technology.

According to the present invention, it is preferred that the communication system is an in-vehicle communication system. Thereby, it is possible to use the communication system and the mobile devices connected to the communication system in a vehicle and especially while driving the vehicle. Especially, it is possible according to the present invention that the driver of the vehicle is able to use the communication system and the mobile devices connected thereto in a less complicated way such that less attentiveness is required for controlling the communication system and the connected mobile devices.

The prioritization of the mobile devices can be changed or adapted or initially set by means of a user input to the communication system, e.g. by choosing the mobile device (e.g. a first mobile device) having the first priority in the first operating state, by choosing the mobile device (potentially different, e.g. a second, mobile device) having the first priority in the second operating state and by choosing the mobile device (potentially still different, e.g. third, mobile device) having the first priority in the third operating state. Such a change or adaption or initial definition of the prioritized mobile devices can, e.g., be provided by means of a menu structure of the functions menu of the communication system. Alternatively, according to the present invention, it is possible that the prioritization of the mobile devices is defined automatically by using the communication system and the mobile devices or that the communication system provide a suggestion of a prioritization of a mobile device in one or a plurality of operating states. Besides the prioritization information, further information such as the MAC-address (Medium Access Control address) or an identification information can be stored in a memory device associated to or integrated in the communication system.

Thereby, it is advantageously possible that a user interaction is not necessarily required or that user interaction is reduced in defining the prioritization of mobile devices corresponding to specific operating states. For example, if a specific mobile device (of the plurality of mobile devices connected or connectable to the communication system) is repeatedly and predominantly used in relation to a specific operating state (e.g. a specific mobile phone is preferably used for mobile telephone communication or message exchange), then the communication system could suggest to prioritize this specific mobile device with respect to this specific operating state.

According to the present invention, it is furthermore preferred that the prioritization is changed in dependency of the user that the vehicle is actually using. If, e.g., two different users use the vehicle and have access to the vehicle—e.g. by means of a key or other entry and/or identification device—a different prioritization of the mobile devices is advantageously possible dependent on whether user one or user two uses the vehicle. The information which one of the users (in the example two users) is currently using the vehicle (e.g. as a driver) can either be transmitted automatically to the communication system, e.g. by means of the entry device and/or the identification device (e.g. by means of a personalized key or identity card) and/or by means of a biometric sensor identifying the user. Alternatively, the information which one of the users (in the example two users) is currently using the vehicle can be input to the communication system by the respective user.

Furthermore, it is preferred according to the present invention that the operating state is changed in dependency of the vehicle driving condition.

Thereby, it is advantageously possible that the driver can be alerted in case of potentially dangerous vehicle conditions, e.g. in case that a message is generated by a vehicle alerting system to be displayed in a fashion that there are chances that the driver actually recognizes the content of the message.

According to the present invention, it is also preferred that the operating state is changed in dependency of an information input by a user.

Thereby, it is advantageously possible that the user changes the operating state, e.g. from conducting a navigational task to playing an audio source from one of the mobile devices, such as an MP3-Player.

Furthermore, it is preferred according to the present invention that the operating state is changed in dependency of a communication event or in dependency of an operating condition of one of the mobile devices.

Thereby, it is advantageously possible that, e.g. the event of an incoming telephone call and/or an incoming message or e-mail switches the operating state of the communication system such that the previously defined (prioritized) mobile device is selected to be used in a preferred manner.

The present invention also relates to a communication system connectable to at least a first mobile device and a second mobile device, wherein the communication system is operable in at least a first operating state and a second operating state, wherein the connection of the communication system to the first mobile device is prioritized in the first operating state and wherein the connection of the communication system to the second mobile device is prioritized in the second operating state.

According to the present invention, it is preferred that the communication system is an in-vehicle communication system and that the in-vehicle communication system is fixedly built in the vehicle.

According to the present invention, it is also preferred that the in-vehicle communication system is fixedly built in the vehicle by the Original Equipment Manufacturer (OEM).

Furthermore, the present invention also relates to the use of a Communication system according to the present invention for communicating and/or being entertained while steering the vehicle.

Especially, is advantageously possible according to the present invention to use the communication system of the vehicle and the associated or connected mobile devices in such a way as to be less distracted from the traffic situation of the vehicle.

The invention will become more fully understood from the following detailed description, taken in conjunction with the accompanying drawings, wherein like reference numerals refer to like elements.

BRIEF DESCRIPTION OF THE DRAWINGS

FIG. 3 shows different possible display screen contents containing information regarding the prioritization of the mobile devices related to different operating states of the communications system.

DETAILED DESCRIPTION

Before turning to the figures which illustrate the application in detail, it should be understood that the application is not limited to the details or methodology set forth in the following description or illustrated in the figures. It should also be understood that the phraseology and terminology employed herein is for the purpose of description only and should not be regarded as limiting the scope of the present invention.

Figure 1:
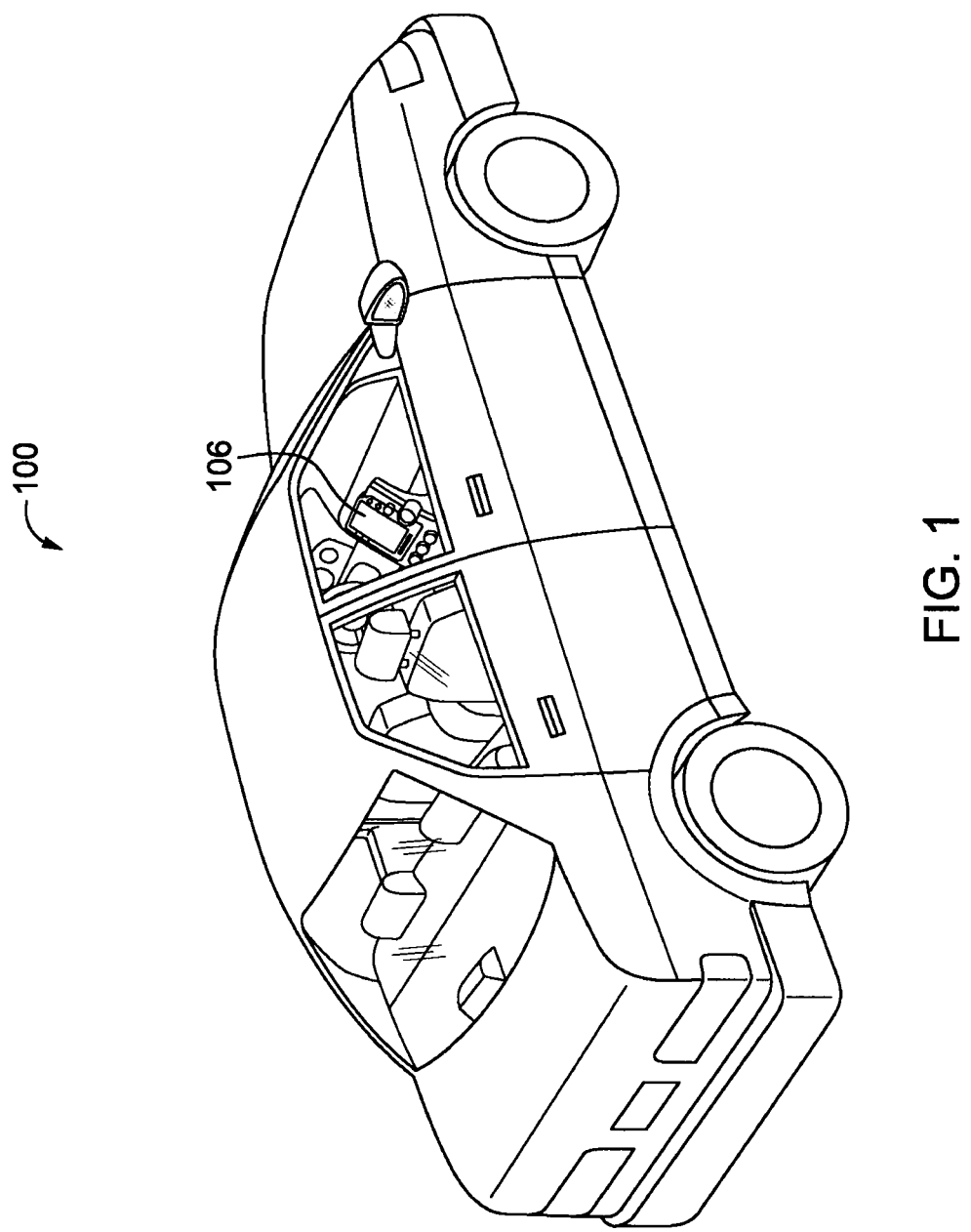
FIG. 1 shows a perspective view of a motor vehicle that includes an in-vehicle communication system.

Referring to FIG. 1, a vehicle 100 includes an in-vehicle communication system 106 (e.g., media system, navigational system, entertainment system, display system, control system, etc.) comprising preferably a display means or another user interaction means.

Figure 2:
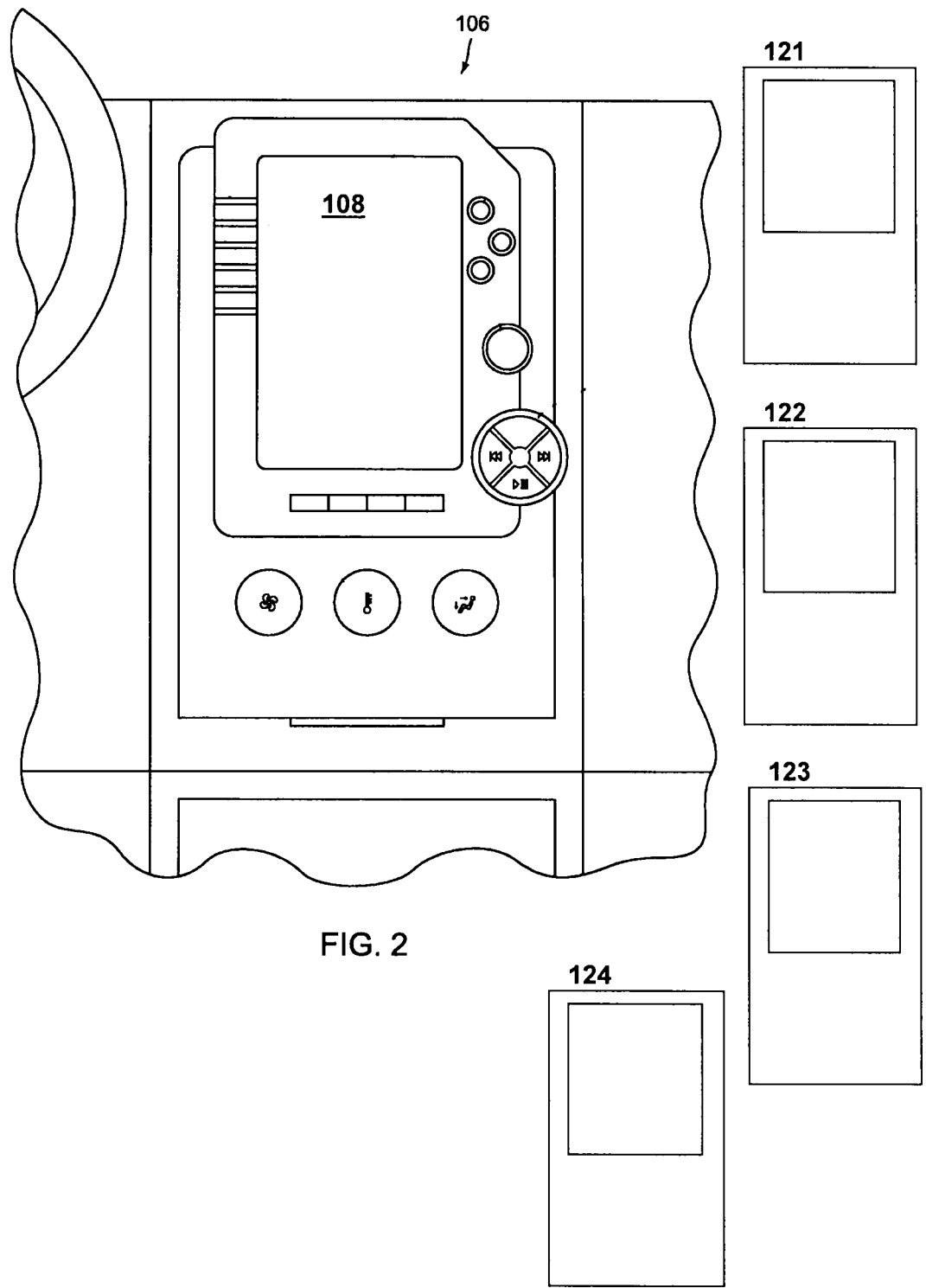
FIG. 2 shows a front view of the in-vehicle communication system and a plurality of mobile devices.

Referring to FIG. 2, the in-vehicle communication system 106 is shown together with a certain number of mobile devices 121, 122, 123, 124. The in-vehicle communication system 106 includes the display means 108 (also called output display), and preferably one or more knobs or input means, and/or one or more pushbuttons, and/or one or more tactile user inputs or pushbuttons, which facilitate controlling various vehicle functions. Output display 108 may be configured to display data related to the control of vehicle functions. The output display 108 may be a touch-screen display or any other non-touch sensitive display. The output display 108 may be of any technology (e.g., LCD, DLP, plasma, CRT), configuration (e.g., portrait or landscape), or shape (e.g., polygonal, curved, curvilinear). The output display 108 may be an original equipment manufacturer (OEM) installed display, an aftermarket display, or an output display from any source. Output display may be an embedded display (e.g., a display embedded in the control system or other vehicle systems, parts, or structures), or a display having any other configuration.

In FIG. 2 four different mobile devices, namely a first mobile device 121, a second mobile device 122, a third mobile device 123, and a fourth mobile device 124 are schematically shown. These mobile devices 121, 122, 123, 124 are only meant to be representative for any number of mobile devices connected or connectable to the communication system 106, e.g. media players, mobile phones, portable or handheld computers, personal digital assistants, smart phones, navigational devices off-board data storage devices or other handheld/mobile devices.

In FIG. 3 different possible screen contents of the display 108 containing information regarding the prioritization of the mobile devices 121, 122, 123, 124 related to different operating states of the communications system are shown. On the left hand side of FIG. 3, the prioritization of the mobile devices 121, 122, 123, 124 is shown for a first operating state represented by the indication A. In the first operating state A, the second mobile device 122 is prioritized, i.e. the second mobile device 122 has received the highest priority. The second highest priority is assigned to the first mobile device 121. The third highest priority is assigned to the third mobile device 123, and the fourth (and in this exemplary embodiment the last) priority is assigned to the fourth mobile device 124. In the middle of FIG. 3, the prioritization of the mobile devices 121, 122, 123, 124 is shown for a second operating state represented by the indication B. In the second operating state B, the fourth mobile device 124 is prioritized, i.e. the fourth mobile device 124 has received the highest priority. The second highest priority is assigned to the first mobile device 121. The third highest priority is assigned to the third mobile device 123, and the fourth (and in this exemplary embodiment the last) priority is assigned to the second mobile device 122. On the right hand side of FIG. 3, the prioritization of the mobile devices 121, 122, 123, 124 is shown for a third operating state represented by the indication C. In the second operating state C, the fourth mobile device 124 is prioritized, i.e. the fourth mobile device 124 has received the highest priority. The second highest priority is assigned to the second mobile device 122. The third highest priority is assigned to the third mobile device 123, and the fourth (and in this exemplary embodiment the last) priority is assigned to the first mobile device 121. In the example of FIG. 3, three different operating states A, B, C are schematically shown. The first operating state A corresponds, e.g. to a situation where the driver is listening to music or another audio content from an audio source. The prioritized second mobile device 122 is, e.g. an MP3-player. The second operating state B corresponds, e.g. to a situation where the driver communicates via a mobile telecommunications connection. The prioritized fourth mobile device 124 is, e.g. a mobile phone. The third operating state C corresponds, e.g. to a situation where a navigational task is conducted using GPS signals via an antenna located in the vehicle. The prioritized fourth mobile device 124 is, e.g. the mobile phone having (e.g. inherently) a navigation capability or a software application able to perform the navigation task.

Although only certain embodiments of the invention have been described herein, it will be understood by any person skilled in the art that other modifications variations and possibilities of the invention are possible without departing from the broader spirit of the invention. Such modifications, variations and possibilities are therefore to be considered as falling within the spirit and scope of the invention and hence forming part of the invention as herein described and/or exemplified. Accordingly, the specification and drawings are to be regarded in an illustrative sense rather than in a restrictive sense.

The invention claimed is:

1. Method for using a communication system connected to at least a first mobile device and a second mobile device, wherein the communication system is operable in at least a first operating state and a second operating state corresponding to different situations where a user operates the communication system, wherein the connection of the communication system to the first mobile device is most highly prioritized in the first operating state, wherein the connection of the communication system to the second mobile device is most highly prioritized in the second operating state, wherein the communication system is an in-vehicle communication system comprising a first mobile device for placing or receiving a telephone call and/or a media system and/or a navigational system and/or an entertainment system and/or a display system and/or a control system in one of the first or second operating states, wherein the in-vehicle communication system further comprises a display means configured to display data related to a control of vehicle functions and/or another user interaction means configured to facilitate controlling various vehicle functions, wherein the first and second operating states comprise a use of the communication system and/or the first or second mobile device for:

placing a telephone call;

receiving a telephone call;

writing a message according to a standard for mobile communication;

conducting a navigational task;

listening to music or another audio and/or video and/or multimedia content; or conducting a financial transaction;

wherein the prioritization of the mobile devices is initially configurable by means of a user input to the communication system by means of a menu structure of a functions menu of the communications system, wherein the operating state is changed in dependency of the vehicle driving condition and/or a capability or a software application of the prioritized mobile device.

2. Method according to claim 1, wherein the prioritization of the mobile devices is dependent on the user that is actually using the vehicle.

3. Method according to claim 1, wherein the operating state is changed in dependency of an information input by a user.

4. Method according to claim 1, wherein the operating state is changed in dependency of a communication event or in dependency of an operating condition of one of the mobile devices.

5. Method for using a communication system connected to at least a first mobile device and a second mobile device, wherein the communication system is operable in at least a first operating state and a second operating state corresponding to different situations where a user operates the communication system, wherein the connection of the communication system to the first mobile device is most highly prioritized in the first operating state and wherein the connection of the communication system to the second mobile device is most highly prioritized in the second operating state, wherein the communication system is an in-vehicle communication system comprising a first mobile device for placing or receiving a telephone call and/or a media system and/or a navigational system and/or an entertainment system and/or a display system and/or a control system in one of the first or second operating states, wherein the in-vehicle communication system comprises a display means configured to display data related to a control of vehicle functions and/or another user interaction means configured to facilitate controlling various vehicle functions, wherein the first and second operating states comprise a use of the communication system and/or the first or second mobile device for:

placing a telephone call;

receiving a telephone call;

writing a message according to a standard for mobile communication;

conducting a navigational task;

listening to music or another audio and/or video and/or multimedia content; or conducting a financial transaction; and wherein the prioritization of the mobile devices dependent on the operating state of the communication system is defined automatically by using the communication system and the mobile devices, wherein the operating state is changed in dependency of the vehicle driving condition and/or a capability or a software application of the prioritized mobile device.

6. Communication system connectable to at least a first mobile device and a second mobile device, wherein the communication system is operable in at least a first operating state and a second operating state corresponding to different situations where a user operates the communication system, wherein the connection of the communication system to the first mobile device is most highly prioritized in the first operating state and wherein the connection of the communication system to the second mobile device is most highly prioritized in the second operating state wherein the communication system is an in-vehicle communication comprising a first mobile device for placing or receiving a telephone call and/or a media system and/or a navigational system and/or an entertainment system and/or a display system and/or a control system in one of the first or second operating states, wherein the in-vehicle communication system comprises a display means configured to display data related to a control of vehicle functions and/or another user interaction means configured to facilitate controlling various vehicle functions, wherein the first and second operating states comprise a use of the communication system and/or the first or second mobile device for:

placing a telephone call;
receiving a telephone call;
writing a message according to a standard for mobile communication;
conducting a navigational task;
listening to music or another audio and/or video and/or multimedia content; or
conducting a financial transaction;

wherein the prioritization of the mobile devices is initially configurable by means of a user input to the communication system by means of a menu structure of a functions menu of the communications system, wherein the in-vehicle communication system is fixedly built in the vehicle by the Original Equipment Manufacturer, wherein the operating state is changed in dependency of the vehicle driving condition and/or a capability or a software application of the prioritized mobile device.

7. Use of a communication system according to claim 6 for communicating and/or being entertaining while steering the vehicle.

* * * * *